United States Patent [19]

Perplies

[11] 4,454,045
[45] Jun. 12, 1984

[54] PROCESS FOR PURIFICATION OF MIXTURES CONTAINING WATER, SALTS, GLYCOLATE IONS AND ORGANIC SOLVENTS

[75] Inventor: Eberhard Perplies, Walluf, Fed. Rep. of Germany

[73] Assignee: Hoechst Aktiengesellschaft, Frankfurt am Main, Fed. Rep. of Germany

[21] Appl. No.: 372,013

[22] Filed: Apr. 26, 1982

[30] Foreign Application Priority Data

May 13, 1981 [DE] Fed. Rep. of Germany ....... 3118953

[51] Int. Cl.$^3$ ............................................. B01D 15/04
[52] U.S. Cl. ..................................... 210/672; 210/683
[58] Field of Search ............................... 210/656–659, 210/672, 683, 692, 685; 536/98

[56] References Cited

U.S. PATENT DOCUMENTS

| 2,517,577 | 8/1950 | Klug et al. | 260/231 |
| 2,617,800 | 11/1952 | Bergman | 260/232 |
| 3,069,409 | 12/1962 | Henry et al. | 260/231 |
| 3,284,441 | 11/1966 | Bishop et al. | 536/98 |
| 3,347,855 | 10/1967 | Nelson | 260/231 |
| 3,361,740 | 1/1968 | Sommers | 260/231 |
| 3,859,349 | 1/1975 | Cody | 260/535 R |
| 4,017,671 | 4/1977 | Schminke et al. | 536/98 |
| 4,054,601 | 10/1977 | Metz et al. | 260/535 R |

FOREIGN PATENT DOCUMENTS

| 1239284 | 11/1967 | Fed. Rep. of Germany . |
| 1801553 | 5/1970 | Fed. Rep. of Germany . |
| 2305170 | 8/1974 | Fed. Rep. of Germany . |
| 2557576 | 6/1977 | Fed. Rep. of Germany . |
| 2810906 | 9/1979 | Fed. Rep. of Germany . |
| 2810975 | 9/1979 | Fed. Rep. of Germany . |
| 2557576 | 5/1981 | Fed. Rep. of Germany . |

OTHER PUBLICATIONS

Stevens, T. S. et al., "Determination of Anions in Boiler Blow-Down Water with Ion Chromatograhy" *Anal. Chem.*, vol. 49, No. 8 (Jul. 1977), pp. 1176–1178.
"Encyklopaedie der Technischen Chemie" 4th Edition (Ullmanns).

*Primary Examiner*—Ivars C. Cintins
*Attorney, Agent, or Firm*—Schwartz, Jeffery, Schwaab, Mack, Blumenthal & Koch

[57] ABSTRACT

A process for purifying or working-up a mixture containing water, water-soluble salts, organic ions and organic solvents, particularly mixtures of water, NaCl, Na glycolate and aliphatic alcohols such as methanol or isopropanol, by separating the mixture into its components using acidic and/or basic ion exchangers, in particular, using weakly basic anion exchangers after optionally adjusting the pH of the mixture to an acid value. The process is especially suited for purifying liquid reaction media and/or washing media from the production of polysaccharides, such as cellulose ethers or starch ethers containing sodium-carboxymethyl group substituents, which are prepared from polysaccharides, an alkali metal hydroxide and monochloroacetate ions in a medium containing water and at least one organic solvent.

17 Claims, No Drawings

PROCESS FOR PURIFICATION OF MIXTURES CONTAINING WATER, SALTS, GLYCOLATE IONS AND ORGANIC SOLVENTS

BACKGROUND OF THE INVENTION

The present invention relates to a process for purifying or working-up mixtures containing water, water-soluble salts, glycolate ions and organic solvents. The invention also relates to the use of such a process for working-up the liquid reaction media and washing media produced in the manufacture of polysaccharide ethers containing sodium-carboxymethyl groups.

In large-scale industrial processes, glycolic acid or its salts are frequently produced from monochloroacetic acid by alkaline hydrolysis. A reaction which is in principle comparable with the above also takes place as a side-reaction, when monochloroacetate ions, which result from monochloroacetic acid or its salts, are employed as an etherification agent for organic compounds containing hydroxyl groups, for example polysaccharides such as cellulose or starch. That is to say some monochloroacetate ions are also hydrolyzed to glycolate ions (hydroxyacetate ions), in addition to the reaction of the monochloroacetate ions with the hydroxyl groups of the organic compounds to form ethers. In view of the increasing importance of regulations mandating the least possible pollution of the environment by waste water, it is necessary to optimally purify waste waters before they are discharged into water systems. This is particularly true of waste waters containing organic by-products from chemical reactions which have a high chemical oxygen demand. At the same time, distillation of organic solvents, which are frequently employed in chemical reactions, for example as diluents or dispersant additives, consumes relatively large amounts of energy. Therefore, a very intensive search is being made for separation and purification processes for processing or working-up by-products of reactions, liquid reaction media and/or liquid washing media including for example, mixtures which particularly contain salts, water, organic solvents, acids and/or bases. However, the separation of relatively small residual amounts of salt, which are formed as by-products in chemical reactions and/or neutralization steps, from organic compounds is also frequently difficult, so that less expensive separation methods are also sought for such cases.

From the prior art for the production of carboxyalkyl ethers of polysaccharides, particularly cellulose, the following processes in which organic solvents are added may be mentioned as examples:

U.S. Pat. No. 2,517,577 describes a process for the preparation of water-soluble sodium carboxyalkylcellulose (NaCAlkC) in which an organic solvent is added to a suspension of cellulose, an aqueous alkali metal hydroxide solution and an etherification agent. n-Propanol, isopropanol, various butanols, acetone and dioxane are listed as suitable organic solvents. No information is given concerning the working-up of the organic solvents or the by-products of the reaction. Even the more recent U.S. Pat. No. 3,284,441 and U.S. Pat. No. 3,069,409, which describe modifications of the aforementioned process, contain no information on how to work up these components.

German Pat. No. 1,239,284 discloses a process for producing carboxymethyl starch (CMS) or carboxymethylamylose which is readily gelled in water. In this process the etherification reaction is carried out in a suspension which contains methanol, ethanol, acetone or isopropyl alcohol. The working-up of the intermediately produced sodium carboxymethyl starch (NaCMS) by suspending it in an aqueous medium containing hydrochloric acid and one of the listed organic solvents is also disclosed. However, no further information is given on the working-up of the organic solvents or of the by-products of the reaction.

The process for preparation of alkali metal salts of CMC (carboxymethylcellulose) according to U.S. Pat. No. 3,361,740 is carried out in the alkalization and etherification stages in such a manner that the reaction suspension contains an aliphatic alcohol having 2 to 4 carbon atoms and an aromatic hydrocarbon. No information is given concerning the working-up of the organic solvents or of the by-products of the reactions.

In the process for producing alkali metal CMC according to U.S. Pat. No. 3,347,855, a water/acetone mixture is employed as the liquid medium during the alkalization and the etherification of the cellulose. After the end of the reaction, the water/acetone mixture is separated from solid reaction products in a separator and is transferred to an acetone recovery column. In this column, excess water is removed from the water/acetone mixture. The acetone is returned to the reaction cycle. No information is to be found concerning the working-up of the by-products of the reaction.

Also in German Offenlegungsschrift No. 1,801,553, which describes the use of an ethanol/isopropanol mixture in a process for the preparation of alkali metal CMC, no information is given on working-up either of the solvent mixture or of the by-products of the reaction.

U.S. Pat. No. 4,017,671 and German Offenlegungsschrift No. 2,557,576 disclose, respectively, the continuous and non-continuous preparation of NaCMC in a reaction suspension containing isopropanol. After carrying out the reaction, it is possible to separate the aqueous isopropanol from the solid reaction components by mechanical means, and to return the aqueous propanol to the reaction mixture without additional treatment such as distillation. No information is to be found concerning the working-up of the by-products of the reaction.

Although Ullmans Encyklopadie der technischen Chemie (Encyclopedia of Technical Chemistry), Verlag Chemie-Weinheim, 4th edition-1975, volume 9, pages 192 to 212 states, under the heading "Celluloseäther" (cellulose ethers) on page 201, right-hand column, that etherification agents are removed from the actual reaction by being hydrolyzed, and this therefore represents a substantial burden in the economics of cellulose etherification, and on pages 203/204 that essentially NaCl and Na glycolate—depending on the method of carrying out the reaction—are produced as by-products of the etherification of cellulose with monochloroacetic acid or its salts to give NaCMC or CMC, no information is given concerning the working-up of these by-products. In describing a procedure for purification of crude NaCMC, it is stated that the organic solvents used for this purpose can be purified by continuous distillation and re-used.

The following are examples of publications relating to the working-up of reaction mixtures containing glycolic acid (hydroxyacetic acid), its salts or similar compounds, and by-products formed in the reaction:

German Offenlegungsschrift No. 2,305,170 describes a three-stage process for the preparation of aqueous, highly concentrated glycolic acid nitrile solutions. In the first two stages of this process, hydrocyanic acid is added onto formalin in a thermostatically controlled column or vessel, and in the third stage the reaction products are after-treated in a cation exchanger. Alkali metal and alkaline earth metal cations formed during the reaction are removed from the reaction mixture in the strongly acidic ion exchanger, and the aqueous solution leaving the ion exchanger has a pH value of $\leq 2$.

U.S. Pat. No. 4,054,601 discloses a process for purifying aqueous crude glycolic acid solutions produced by acidic and thermal hydrolysis of glycolic acid nitrile. The crude glycolic acid is removed from the salt-containing reaction medium by counter-current extraction with an organic solvent mixture of a neutral phosphoric acid ester such as tributyl phosphate and an aliphatic ether such as diisopropyl ether, and the glycolic acid is recovered again from the solvent mixture in the form of an aqueous solution by counter-current extraction with water.

In the preparation of glycolic acid from the mother liquors in the production of monochloroacetic acid according to German Offenlegungsschrift No. 2,810,906, the reaction mixture of glycolic acid, dichloroacetic acid, water and alkali metal chloride formed during the thermal hydrolysis of the optionally neutralized mother liquor is extracted with a preferably water-insoluble organic solvent such as a halogenated hydrocarbon. In this extraction stage, the dichloroacetic acid is substantially removed from the reaction mixture. Glycolic acid and alkali metal chloride primarily remain in the aqueous phase, whereby a major portion of the salt can be precipitated in crystalline form and separated by concentrating the solution, for example, by carefully distilling off the water in vacuo.

According to German Offenlegungsschrift No. 2,810,975, the inevitable formation of salts during the alkaline hydrolysis of monochloroacetic acid is avoided by carrying out the hydrolysis thermally in the absence of alkali metal hydroxides.

In German Offenlegungsschrift No. 2,812,682 and German Offenlegungsschrift No. 2,812,683, sodium chloride is removed from aqueous glycolic acid solutions produced by alkaline hydrolysis of monochloroacetic acid, by adding to the solutions a water-miscible organic solvent, such as acetone or 1,4-dioxane, or an organic solvent which is water-immiscible or has only a limited miscibility with water, such as diethyl ketone, methyl isobutyl ketone or dibutyl ether. Depending on the type of organic solvent, either the solvent or the water is then removed from the mixture by distillation, and sodium chloride is precipitated from the mixture either when the organic solvent is added or only when the water is distilled off. In addition to monomeric glycolic acid, oligomeric and polymeric forms (glycolides, polyglycolides) which represent a lactide or polyester form are also obtained in most of the previously described processes.

However, the processes known from the prior art have the following disadvantages:
Although the complete distillative work-up of liquids containing water and organic solvents, such as liquid reaction media or washing media, can result in recovery of the organic solvents employed, it consumes large amounts of energy and is therefore a significant cost factor.

The distillation residue or "bottoms" remaining after distillative work-up of such liquids contains—depending on the composition of the liquid mixture to be distilled—a large number of compounds, particularly salts and low volatility organic solids, the latter resulting in a high chemical oxygen demand (COD) of the waste water.

Extraction of such distillation residues with the most diverse organic solvents in order to separate organic by-products such as sodium glycolate or glycolic acid from the usual salts such as sodium chloride leads in turn to the problems of working-up large amounts of organic solvent by distillation.

SUMMARY OF THE INVENTION

Accordingly, it is the object of the present invention to provide an improved process for purification of mixtures containing water, salts, glycolate ions and organic solvents.

A further object of the invention is to provide a process for purification of a mixture containing water, salts, organic ions and organic solvents to produce waste water which results in minimal pollution of the environment when discharged into water systems.

It is also an object of the present invention to provide a process for purification of mixtures containing water, salts, organic ions and organic solvents which can successfully separate organic compounds from a waste water to produce a waste water having a low chemical oxygen demand.

Another object of the present invention is to provide a process for purification of mixtures containing water, salts, organic ions and organic solvents which is comparatively economical to carry out.

Additionally, it is an object of the present invention to provide a process for purification of mixtures containing water, salts, organic ions and organic solvents which does not consume large amounts of energy.

A still further object of the present invention is to provide a process for purifying mixtures containing water, salts, organic ions and organic solvents which avoids the need of working-up large amounts of additional organic solvents.

Yet another object of the present invention is to provide a process for purifying waste water containing water, salts, organic ions and organic solvents from industrial organic reactions.

An additional object of the present invention is to provide a process for working-up reaction media and washing media from the production of polysaccharide ethers having sodium carboxymethyl groups.

It is also an object of the present invention to provide a process for purification of mixtures containing water, salts, organic ions and organic solvents which is capable of economically and efficiently separating small amounts of salts from the liquid medium.

These and other objects of the invention are achieved by providing a process for working-up mixtures containing water, salts, organic ions and organic solvents comprising separating the mixture into its components on acidic and/or basic ion exchangers.

The invention is based on the purification of mixtures containing water, water-soluble salts, glycolate ions and organic solvents, by separating the mixture into its components on acidic and/or basic ion exchangers. The invention is particularly applicable to purification of mixtures comprising water, sodium chloride, sodium glycolate and at least one aliphatic alcohol having 1 to 6 carbon atoms.

In particularly preferred embodiments of the process of the invention, either (a) the salts of the mixture to be treated are first converted into the acid form, for example by introduction onto a strongly acidic ion exchanger, and the acidic mixture is then separated on a weakly basic ion exchanger, or (b) the mixture to be treated is first separated on a weakly basic ion exchanger, after which individual fractions can be acidified, for example by introduction onto a strongly acidic ion exchanger.

DETAILED DESCRIPTION OF PREFERRED EMBODIMENTS

Ion exchangers which can be employed in the invention include the commercially available types formed from synthetic resins, such as polystyrene or polyacrylate resins (for example styrene/divinylbenzene copolymers or acrylate/divinylbenzene copolymers) having the following conventional fixed ions: $-SO_3^-$ ions for strongly acidic cation exchangers, $-COO^-$ ions for weakly acidic cation exchangers, $-NR_3^+$ ions (wherein R represents an alkyl or hydroxyalkyl group such as $-CH_3$ or $-CH_2-CH_2-OH$) for strongly basic anion exchangers and $-N(CH_3)_2H^+$, $-NH_3^+$ or $>NH_2^+$ for weakly basic anion exchangers. The following ion exchangers are preferred in the process of the invention:

strongly acidic cation exchangers formed from polystyrene-sulfonic acid, in the gel form (for example ®Amberlite IR 120 from Rohm & Haas Co.—Philadelphia, U.S.A., or ®Permutit RS-12 from Permutit GmbH—Berlin, Germany, or in a macroporous form (for example ®Permutit RSP-100), weakly basic anion exchangers formed from acrylates and containing tertiary amino groups, in the gel form (for example ®Amberlite IRA 67 or IRA 93), or formed from polystyrene and containing tertiary amino groups, in a macroporous form (for example ®Permutit EM-13).

Further types of ion exchangers, the terms and definitions used in this technology, and the procedures for using ion exchangers are known to persons skilled in the art as evidenced by the section of Ullmanns Encyklopadie der technischen Chemie (Encyclopedia of Technical Chemistry), 4th edition—volume 13, Verlag Chemie—Weinheim, 1977, under the heading "Ionenaustauscher" (ion exchangers), on pages 279 to 341.

The mixtures to be purified also contain, in addition to water, water-soluble salts such as alkali metal chlorides or nitrates, glycolate ions (resulting from glycolic acid or its salts) and organic solvents such as acetone, methanol, isopropanol, dioxane and/or methyl ethyl ketone. In the purification or working-up of these mixtures according to the invention by separation of the components on acidic and/or basic ion exchangers, the components can be isolated so that they can be re-used. That is to say the organic solvents can, for example, be re-used as such, and the glycolic acid can be marketed as an inexpensive commercial product. Thus, it is possible by means of the process of the invention, on the one hand to avoid expensive distillation of all resulting amounts of liquid in order to recover organic solvents, and on the other hand also to obtain an inexpensive byproduct such as glycolic acid in pure form, and at the same time to avoid an extensive pollution of the environment by the waste water. In this process, it is surprising that when ion exchangers are employed according to the invention, it is possible to simultaneously separate the mixture into an electrically neutral organic compound such as an alcohol and various types of salts or acids. For industrial use, it is also significant that the ion exchangers to be employed can be regenerated and re-used over long periods of time without any substantial loss of effectiveness.

The process of the invention is particularly useful for working-up liquid reaction media and/or washing media from the production of polysaccharide ethers containing sodium-carboxymethyl group substituents from polysaccharides such as cellulose, starch, dextrin or dextran, an alkali metal hydroxide and monochloroacetate ions in a medium containing water and at least one organic solvent. For further details of such processes for producing these polysaccharide ethers, reference is made to the prior art described in the background portion of this application, the disclosures of which are hereby incorporated herein by reference. Industrially, the crude carboxymethyl polysaccharides formed in the etherification reaction are also accompanied by substances such as impurities due to water-soluble by-products, including, principally, alkali metal chlorides such as NaCl, and alkali metal glycolates such as sodium glycolate, in addition to insoluble degradation or decomposition products of the polymers. When the normally alkaline reaction mixtures are acidified, for example with nitric acid, additional extraneous ions may be introduced into the system. By means of a subsequent purification of the crude carboxymethylpolysaccharides with water-containing organic solvents such as aqueous methanol or aqueous isopropanol, the major part of the extraneous salts can be removed from the carboxymethylpolysaccharides. As a result, however, in addition to the liquid reaction medium comprising water and organic solvent, the washing stage(s) produce additional amounts of liquid which heretofore could only be purified by distillation, and still give rise to a certain degree of pollution of the waste water, as a result of the presence of non-volatile organic impurities. For these processes of large-scale industrial importance, such as the production of sodium carboxymethylcellulose (NaCMC) or sodium carboxymethyl starch (NaCMS), the process of the invention represents an important contribution to the reduction of costs and to the environmentally advantageous elimination of waste materials since it substantially dispenses with energy-consuming distillations, re-uses organic solvents in the cycle, and does not pollute the waste water with organic pollutants.

The process of the invention and its preferred use will be illustrated in further detail by the following non-limiting examples. In the examples, percentages are expressed in terms of weight, and parts by weight are related to parts by volume as grams to cubic centimeters.

EXAMPLE 1

One hundred seventy-five parts by volume of 75% strength aqueous methanol with a salt content of 3.2% NaCl and 1.6% Na glycolate (employed as a washing medium for crude NaCMC) were introduced into a column which contained 600 parts by volume of a weakly basic anion exchanger in the gel form, made with an acrylic material and containing tertiary amino groups (®Amberlite IRA 93). The column was eluted with water which had been adjusted with dilute aqueous NaOH solution to a pH of about 9. During the introduction of the mixture to be separated and in the first phase of the elution, an alkaline-aqueous methanol was eluted which, after treatment in a strongly acid cation exchanger, can be employed again, in the form of a salt-free organic solvent, as a washing medium for crude NaCMC. A fraction with a significantly enriched concentration of Na glycolate, with 68.8% by weight of the starting amount, followed in the range from about 450 to about 1,000 parts by volume of eluate (with a maximum at about 650 parts by volume), and at the same time 26.3% of the NaCl was also eluted. After treatment of the eluate with a strongly acidic cation exchanger, distillation of the residual methanol and concentration by distillation, a commercial 57% strength NaCl-containing aqueous glycolic acid was obtained, which could be decolorized by conventional methods (for example with active charcoal).

EXAMPLE 2

Seven thousand five hundred parts by volume of 65% strength aqueous isopropanol with a salt content of 0.6% NaCl and 0.4% Na glycolate (liquid reaction medium separated from crude NaCMC) were introduced into a column which contained 600 parts by volume of a strongly acidic cation exchanger. The mixture which had been acidified in this manner and which was still to be separated was then eluted through a column which contained 350 parts by volume of a weakly basic anion exchanger in a macroporous form made of a polystyrene material containing tertiary amino groups (®Permutit EM-13). 4,500 parts by volume of a pure aqueous isopropanol having a conductivity of less than 4.5 $\mu S$ were initially obtained, and the following approximately 1,800 parts by volume comprised a dilute isopropanolic-aqueous glycolic acid solution with a maximum glycolic acid content at about 6,300 parts by volume of eluate and with a hydrochloric acid content in the glycolic acid solution beginning simultaneously and increasing continuously from this maximum. It was possible to re-use the aqueous isopropanol from the first 4,500 parts by volume of eluate directly in the production of NaCMC without an accompanying increase in the proportion of by-products in the system. The isopropanolic-aqueous glycolic acid solution can be separated by distillation into the azeotropic water/isopropanol mixture and aqueous NaCl-free glycolic acid, and the product can be decolorized by conventional methods (for example with active charcoal).

The foregoing description has been set forth merely to illustrate the invention and is not intended to be limiting. Since modifications of the described embodiments incorporating the spirit and substance of the invention may occur to persons skilled in the art, the scope of the invention is to be limited solely with respect to the appended claims and equivalents.

I claim:

1. A process for purifying a mixture comprising water, water-soluble salts, glycolate ions and organic solvents, comprising the steps of:
   contacting the mixture with a first ion exchanger;
   thereafter contacting the product of said first contacting step with a second ion exchanger, said first ion exchanger being either an acidic or a basic ion exchanger and said second ion exchanger being the acidic or basic ion exchanger not utilized for said first ion exchanger;
   eluting the mixture contacting said basic ion exchanger to separate the mixture into a fraction of a significantly enriched organic solvent and a second fraction of a significantly enriched glycolate ion content; and
   collecting the separated fractions.

2. The process as claimed in claim 1, wherein said mixture is separated on a weakly basic ion exchanger.

3. A process as claimed in claim 2, comprising the steps of:
   converting the salts of the mixture into the acid form; and
   thereafter separating the acidic mixture on said weakly basic ion exchanger.

4. A process as claimed in claim 2, comprising the step of initially separating the mixture into said fractions on said weakly basic ion exchanger.

5. A process as claimed in claim 4, further comprising the step of subsequently treating said fractions on said acidic ion exchanger.

6. A process according to claim 1, wherein said mixture is the liquid reaction medium from the production of polysaccharide ethers having sodium-carboxymethyl group substituents, by reacting polysaccharides, an alkali metal hydroxide and monochloroacetate ions in a medium containing water and at least one organic solvent.

7. A process according to claim 1, wherein said mixture is a liquid washing medium from the purification of crude polysaccharide ethers having sodium-carboxymethyl group substituents.

8. A process for purifying a mixture consisting essentially of water, water-soluble salts, glycolate ions and organic solvents, comprising the steps of:
   contacting the mixture with a first ion exchanger;
   thereafter contacting the product of said first contacting step with a second ion exchanger, said first ion exchanger being either an acidic or a basic ion exchanger and said second ion exchanger being the acidic or basic ion exchanger not utilized for said first ion exchanger;
   eluting the mixture contacting said basic ion exchanger to separate the mixture into a fraction of a significantly enriched organic solvent and a second fraction of a significantly enriched glycolate ion content; and
   collecting the separated fractions.

9. The process as claimed in claim 8, wherein said mixture is separated on a weakly basic ion exchanger.

10. A process as claimed in claim 9, comprising the steps of:
    converting the salts of the mixture into the acid form; and
    thereafter separating the acidic mixture on said weakly basic ion exchanger.

11. A process as claimed in claim 9, comprising the step of initially separating the mixture into said fractions on said weakly basic ion exchanger.

12. A process as claimed in claim 11, further comprising the step of subsequently treating said fractions on said acidic ion exchanger.

13. A process for purifying a mixture consisting essentially of water, sodium chloride, sodium glycolate and at least one aliphatic alcohol having one to six carbon atoms, comprising the steps of:
    contacting the mixture with a first ion exchanger;

thereafter contacting the product of said first contacting step with a second ion exchanger, said first ion exchanger being either an acidic or a basic ion exchanger and said second ion exchanger being the acidic or basic ion exchanger not utilized for said first ion exchanger;

eluting the mixture contacting said basic ion exchanger to separate the mixture into a fraction of a significantly enriched organic solvent and a second fraction of a significantly enriched glycolate ion content; and collecting the separated fractions.

14. The process as claimed in claim 13, wherein said mixture is separated on a weakly basic ion exchanger.

15. A process as claimed in claim 14, comprising the steps of:
converting the salts of the mixture into the acid form; and
thereafter separating the acidic mixture on said weakly basic ion exchanger.

16. A process as claimed in claim 14, comprising the step of initially separating the mixture into said fractions on said weakly basic ion exchanger.

17. A process as claimed in claim 16, further comprising the step of subsequently treating said fractions on said acidic ion exchanger.

* * * * *